United States Patent
Mori (10) Patent No.: US 8,350,909 B2
(45) Date of Patent: Jan. 8, 2013

(54) METHOD AND IN-VEHICLE DEVICE FOR CORRECTING ALIGNMENT INFORMATION REPRESENTATIVE OF THE ALIGNMENT OF AN IN-VEHICLE CAMERA

(75) Inventor: Daishi Mori, Tokyo (JP)

(73) Assignee: Alpine Electronics, Inc. (JP)

( * ) Notice: Subject to any disclaimer, the term of this patent is extended or adjusted under 35 U.S.C. 154(b) by 915 days.

(21) Appl. No.: 12/431,263

(22) Filed: Apr. 28, 2009

(65) Prior Publication Data

US 2009/0295922 A1  Dec. 3, 2009

(30) Foreign Application Priority Data

May 30, 2008  (JP) ................................ 2008-142148

(51) Int. Cl.
*H04N 7/18* (2006.01)
(52) U.S. Cl. ......... 348/148; 348/143; 348/147; 348/155
(58) Field of Classification Search .......... 348/143–149, 348/208; 382/104, 107
See application file for complete search history.

(56) References Cited

U.S. PATENT DOCUMENTS

2007/0147661 A1* 6/2007 Fukaya et al. ................ 382/104
2010/0245604 A1* 9/2010 Ohmiya et al. .......... 348/208.99

FOREIGN PATENT DOCUMENTS

| JP | 2003-274394 | 9/2003 |
| JP | 3776514 B2 * | 5/2006 |
| JP | 2007-172237 | 7/2007 |

OTHER PUBLICATIONS

IEEE Search Notes.*

* cited by examiner

*Primary Examiner* — John MacIlwinen
*Assistant Examiner* — Michael Martinez
(74) *Attorney, Agent, or Firm* — Brinks Hofer Gilson & Lione (57) ABSTRACT

A process is repeated in which N state vectors each including, as elements, the position of a camera with respect to a vehicle, the posture of the camera, the width of a lane where the vehicle is driving, and the orientation of the vehicle with respect to the lane are changed according to a predetermined dynamics model, a reference state vector representing the positions of edges of lane marks included in an image captured by the camera is generated when each of the changed state vectors is true, considering the positions of edges of lane marks in the image as an observation vector, the degree of match between the reference state vector and the observation vector is calculated as the weight of the state vector, a weighted average vector of the state vectors is calculated, and N state vectors are resampled on the basis of the calculated weights.

20 Claims, 6 Drawing Sheets

METHOD AND IN-VEHICLE DEVICE FOR CORRECTING ALIGNMENT INFORMATION REPRESENTATIVE OF THE ALIGNMENT OF AN IN-VEHICLE CAMERA

RELATED APPLICATIONS

The present application claims priority to Japanese Patent Application Number 2008-142148, filed May 30, 2008, the entirety of which is hereby incorporated by reference.

BACKGROUND

1. Field of the Invention

The present invention relates to a technique for correcting alignment information that represents the alignment, such as a position and a posture, of a camera installed in a vehicle.

2. Description of the Related Art

One of the known techniques for correcting alignment information that represents the alignment, such as a position and a posture, of a camera installed in a vehicle is a technique for, in a device that generates and displays a bird's eye view image showing the surroundings of a vehicle, capturing, with a camera, an image formed by a laser beam projected onto a road surface from a laser installed in a vehicle and correcting the angle of depression of the camera on the basis of the captured image (for example, Japanese Unexamined Patent Application Publication No. 2003-274394). The device generates and displays a bird's eye view image by converting, through view transformation, an image obtained by shooting the surroundings of a vehicle with a camera to an image obtained when the surroundings of the vehicle are shot from a visual point above the vehicle and performing image combining.

BRIEF SUMMARY

In the technique disclosed in Japanese Unexamined Patent Application Publication No. 2003-274394 for correcting a change in the angle of depression of a camera, a problem exists in that a laser, in addition to a camera, needs to be provided in a vehicle.

Accordingly, it is an object of the present embodiments to correct alignment information that represents the alignment, such as a position and a posture, of a camera installed in a vehicle in a non-complex arrangement.

To achieve the aforementioned object, an in-vehicle device according to a first aspect of the present embodiments installed in a vehicle includes a camera that shoots surroundings of the vehicle, and a correction unit that corrects alignment information that represents alignment of the camera. The correction unit includes a sampling unit that repeats a sampling process of sampling N state vectors each of which includes, as elements, a position of the camera with respect to a reference point of the vehicle, a posture of the camera, a width of a lane where the vehicle is located, a position of the vehicle in a width direction of the lane, and an orientation of the vehicle with respect to a direction of the lane, an update unit that updates the N state vectors sampled by the sampling unit as much as an amount based on a predetermined dynamics model or a random amount, a weight calculation unit that, for each of the N state vectors updated by the update unit, when respective values of individual elements of the state vector are true, calculates a shape of a lane mark to be included in an image captured by the camera and calculates, as a weight of the state vector, a degree of match or similarity between the calculated shape of the lane mark and a shape of a lane mark in the image captured by the camera, and an alignment information generation unit that estimates current alignment of the camera on the basis of the N state vectors, the respective weights of which are calculated by the weight calculation unit, and the respective weights of the N state vectors or on the basis of the N state vectors sampled by the sampling unit and generates the alignment information, which represents the estimated alignment. In this case, in the sampling process for the second and subsequent times, the sampling unit samples new N state vectors on the basis of the respective weights of the N state vectors calculated by the weight calculation unit. Moreover, the alignment of the camera represented by the alignment information may include, for example, at least one of the position of the camera with respect to the reference point of the vehicle and the posture of the camera.

In such an in-vehicle device, the alignment, such as a position and a posture, of a camera installed in a vehicle may be obtained, using the fact that the pattern of a lane mark the image of which is captured by the camera may be uniquely determined in a manner that may depend on the states of the position of the camera with respect to the reference point of a vehicle, the posture of the camera, the width of a lane where the vehicle is located, the position of the vehicle in the width direction of the lane, and the orientation of the vehicle with respect to the direction of the lane, by applying a particle filter when particles are true, the states being the particles, the degree of match between the shape of a lane mark to be included in an image captured by the camera and the shape of a lane mark included in the image being the weight. Thus, in an arrangement that does not need any particular complex device such as a laser, alignment information that represents the alignment, such as a position and a posture, of the camera installed in a vehicle may be corrected.

Moreover, calculation of the degree of match in the weight calculation unit in the in-vehicle device may be performed simply by calculating, when respective values of individual elements of a state vector are true, the degree of match in a manner that depends on whether any edge exists on a position in the image captured by the camera, the position corresponding to a position of an edge of the lane mark to be included in the image captured by the camera.

Moreover, it is preferable that the in-vehicle device further include a running state detection unit that detects a running state of the vehicle, and the update unit updates the N state vectors sampled by the sampling unit in a manner that depends on the dynamics model and the running state detected by the running state detection unit so as to update the state vectors so that the state is close to a true state.

The alignment information generated by the correction unit in the in-vehicle device may be used in various types of processing in which an image captured by a camera is used. That is, for example, when a bird's eye view image display unit that generates and displays a bird's eye view image showing how the surroundings of the vehicle are observed from a position above the vehicle is provided in the in-vehicle device so that the bird's eye view image display unit can generate the bird's eye view image by performing view transformation on the image captured by the camera on the basis of the alignment information generated by the correction unit, a bird's eye view image showing the surroundings can be accurately generated.

Moreover, the sampling process for the second and subsequent times in the sampling unit in the in-vehicle device may be performed by sampling the new N state vectors on the basis of the respective weights of the N state vectors calculated by the weight calculation unit by deleting a state vector with a light weight and duplicating a state vector with a heavy weight, out of the N state vectors updated by the update unit.

Moreover, estimation of the current alignment of the camera in the alignment information generation unit in the in-vehicle device may be performed by (1) estimating, as the current alignment of the camera, alignment of the camera represented by a weighted average vector of the N state vectors in which the weights calculated by the weight calculation unit are used, (2) estimating, as the current alignment of the camera, alignment of the camera represented by an average vector, for a time period, of weighted average vectors of the N state vectors in which the weights calculated by the weight calculation unit are used, (3) estimating, as the current alignment of the camera, alignment of the camera represented by an average vector of the N state vectors sampled by the sampling unit, (4) estimating, as the current alignment of the camera, alignment of the camera represented by an average vector, for a time period, of average vectors of the N state vectors sampled by the sampling unit, (5) estimating, as the current alignment of the camera, alignment of the camera represented by a state vector with a maximum weight calculated by the weight calculation unit, and/or (6) estimating, as the current alignment of the camera, alignment of the camera represented by an average vector, for a time period, of state vectors with a maximum weight calculated by the weight calculation unit.

Moreover, in the in-vehicle device, in order to ensure the reliability of the generated alignment information, the alignment information generation unit may not generate the alignment information until the sampling unit performs the sampling process a predetermined number of times, or the alignment information generation unit may not generate the alignment information until a variance or a standard deviation of the N state vectors sampled by the sampling unit becomes equal to or less than a predetermined threshold value.

Moreover, in the in-vehicle device, when the alignment information is corrected in a static state, the sampling unit may complete the sampling process upon performing the sampling process a predetermined number of times, or the sampling unit may complete the sampling process when a variance or a standard deviation of the sampled N state vectors becomes equal to or less than a predetermined threshold value.

According to the present embodiments, alignment information that represents the alignment, such as a position and a posture, of a camera installed in a vehicle can be corrected in a non-complex arrangement.

DETAILED DESCRIPTION OF THE PREFERRED EMBODIMENTS

An exemplary embodiment of the present invention will now be described.

Figure 1A:
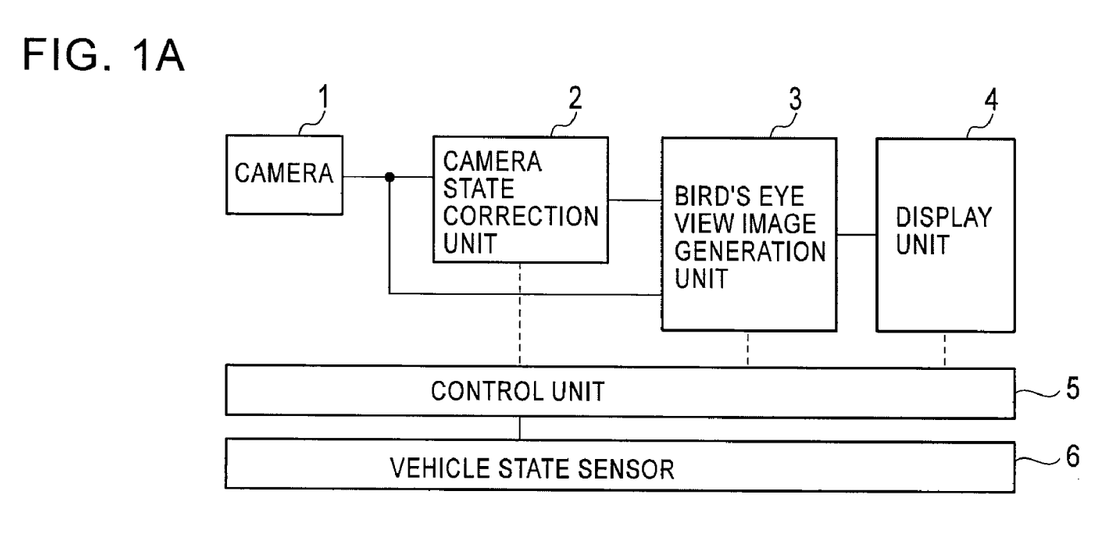
FIG. 1A is a block diagram showing the components of a surrounding monitoring device according to an exemplary embodiment.

FIG. 1A shows the components of a surrounding monitoring device according to the exemplary embodiment.

The surrounding monitoring device includes a camera 1, a camera state correction unit 2, a bird's eye view image generation unit 3, a display unit 4, a control unit 5, and a vehicle state sensor 6, as shown in the drawing.

The surrounding monitoring device may be constructed with a computer as hardware, the computer including, for example, a microprocessor, a memory, and other peripherals. In this case, the camera state correction unit 2 and the bird's eye view image generation unit 3 may be implemented by the microprocessor executing predetermined computer programs.

The vehicle state sensor 6 is a sensor that detects various states of a vehicle, for example, the speed of the vehicle, the state of braking by a parking brake, a steering angle, and an angular speed.

Figure 1B:
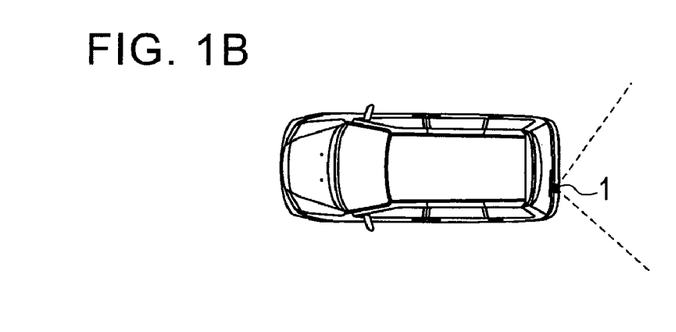
FIG. 1B shows the position of a camera installed in a vehicle.
Figure 2A:
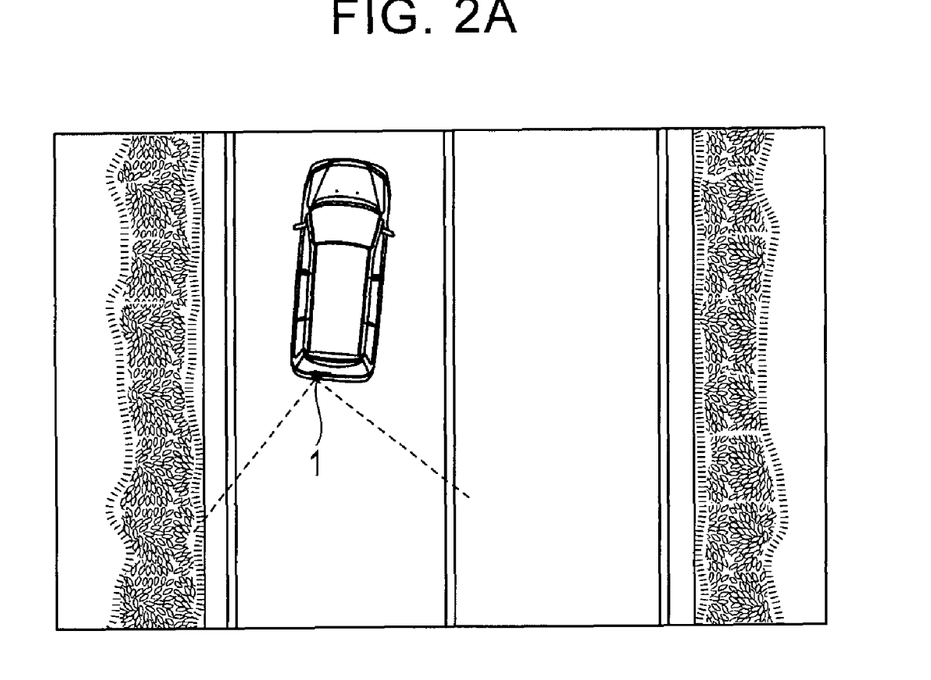
FIG. 2A shows how a vehicle is driving.
Figure 2B:
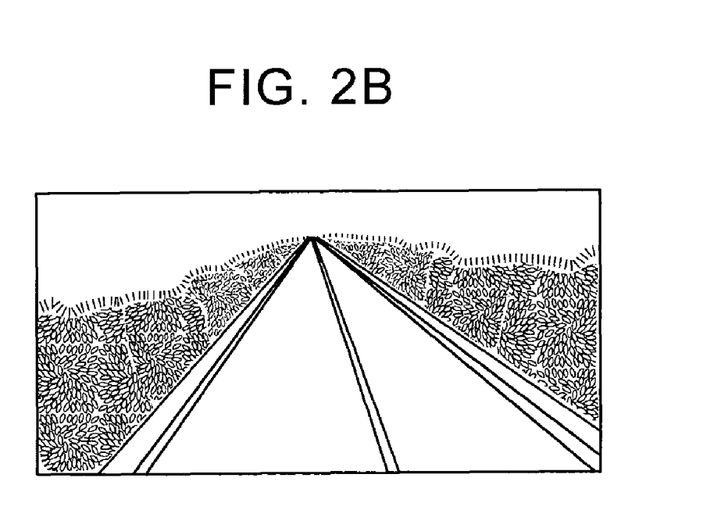
FIG. 2B shows an image captured by a camera in the exemplary embodiment.

The camera 1 is disposed at the rear end of a vehicle, as shown in FIG. 1B. For example, while the vehicle is driving on a road, as shown in FIG. 2A, the camera 1 captures an image that includes lane marks (lane lines) behind the vehicle, as shown in FIG. 2B.

Then, upon receiving an instruction to generate and display a bird's eye view image from the control unit 5, the bird's eye view image generation unit 3 generates a bird's eye view image that is an image obtained when the backside of the vehicle is shot from a visual point above the vehicle by performing view transformation on the image of the backside of the vehicle captured by the camera 1. Then, the bird's eye view image generation unit 3 displays the generated bird's eye view image on the display unit 4.

Figure 3:
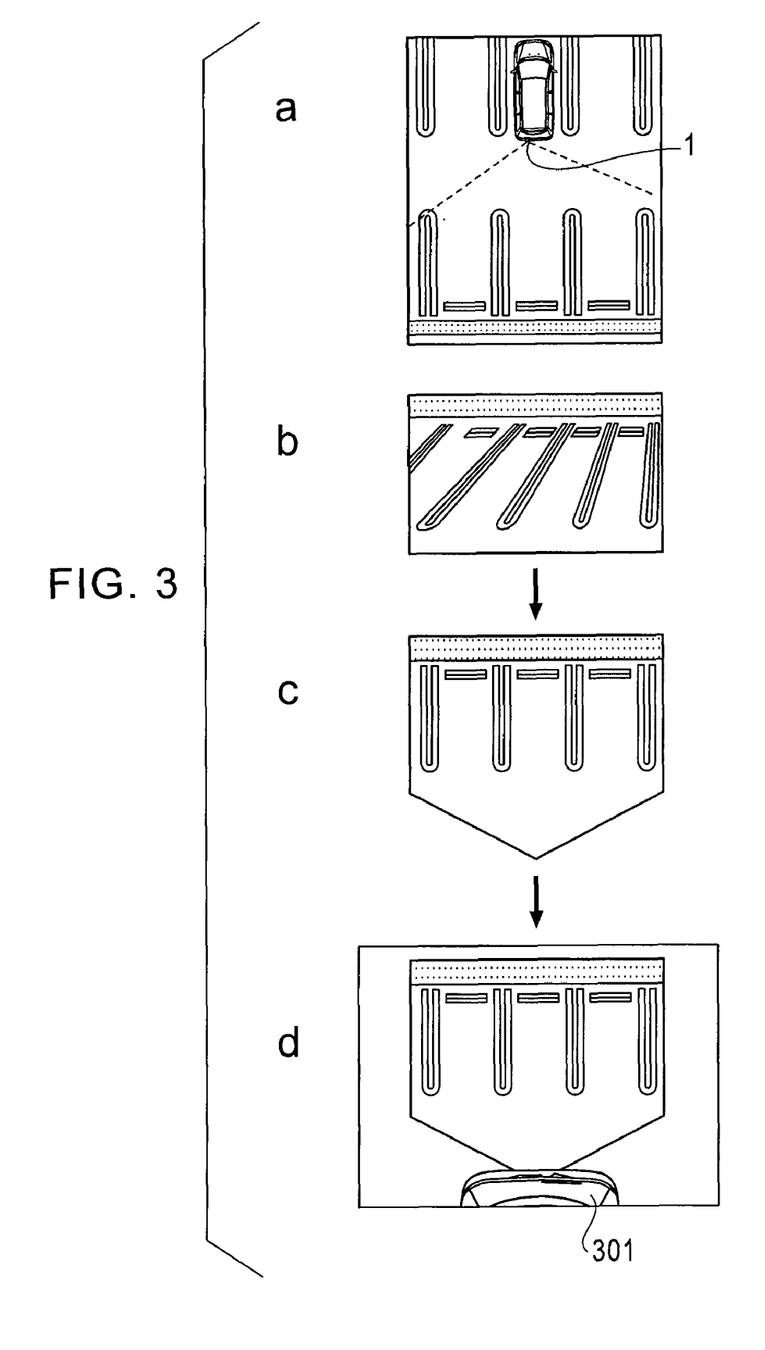
FIG. 3 shows a bird's eye view image displayed in the exemplary embodiment.

Specifically, for example, when the bird's eye view image generation unit 3 has received an instruction to generate and display a bird's eye view image from the control unit 5 while a vehicle moves backward in a parking space, as shown in Part a of FIG. 3, the bird's eye view image generation unit 3 generates a bird's eye view image shown in Part c of FIG. 3 by performing view transformation on the image of the backside of the vehicle captured by the camera 1 shown in Part b of FIG. 3, combines the generated bird's eye view image with a graphic symbol 301 that represents the rear end of a vehicle and is prepared in advance, as shown in Part d of FIG. 3, and then displays the combined image on the display unit 4.

In this case, such view transformation through which an image captured by the camera 1 is converted to a bird's eye view image in the bird's eye view image generation unit 3 is performed on the basis of correspondences between individual positions in an image captured by the camera 1 and individual positions on a ground surface around a vehicle. The correspondences are obtained on the basis of the position and posture of the camera 1 indicated from the camera state correction unit 2.

The camera state correction unit 2 calculates the position and posture, such as an angle, orientation, or other characteristic, of the camera 1 at each point in time and sends a notification of the position and posture of the camera 1 to the bird's eye view image generation unit 3.

The operation of the camera state correction unit 2 sending a notification of the position and posture of the camera 1 will next be described.

The camera state correction unit 2 performs camera state correction for calculating the position and posture of the camera 1 using a particle filter.

Figure 4:
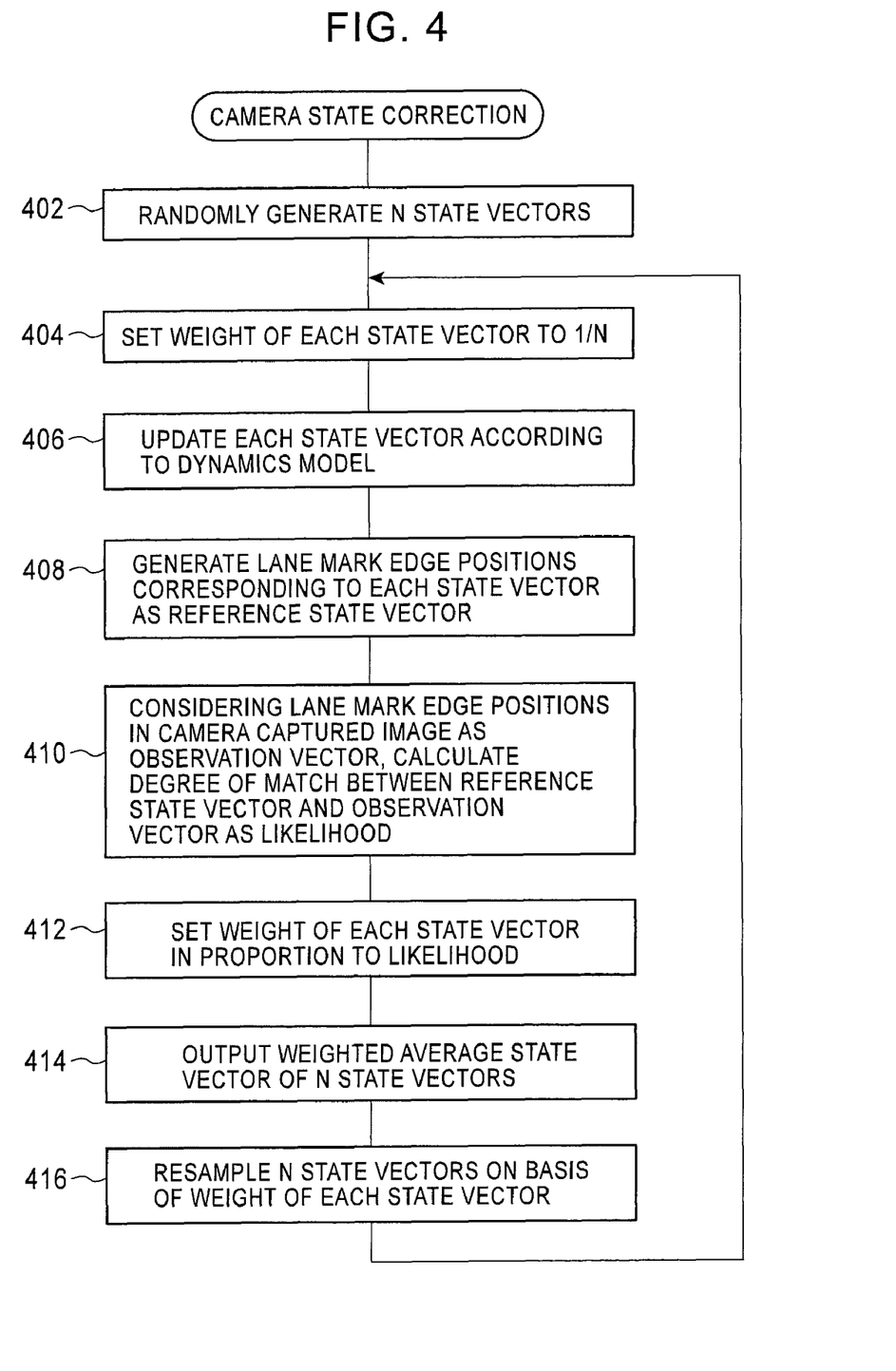
FIG. 4 is a flowchart showing camera state correction according to the exemplary embodiment.

FIG. 4 shows the procedure of camera state correction.

In this processing, in step 402, N state vectors $\chi$ (i)=(tx, ty, tz, rx, ry, rz, w, dy, da) where i=1 to N are first generated randomly, as shown in the drawing.

Figures 5A, 5B, 5C:
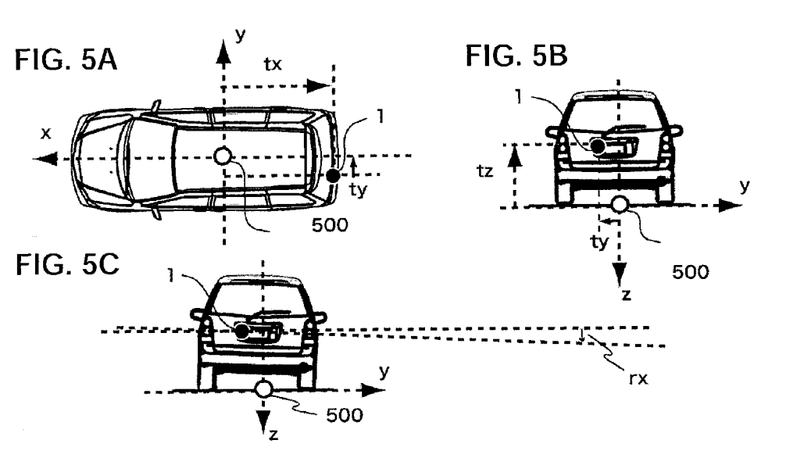
FIGS. 5A to 5F show the individual elements of a state vector used in the exemplary embodiment.

It is assumed that a coordinate system in which a position at the height of a ground surface at the center of a vehicle in the left and right direction and the forward and backward direction is an origin 500, an axis extending from the origin 500 in the forward and backward direction of the vehicle is the x axis, an axis extending from the origin 500 in the left and right direction of the vehicle is the y axis, and an axis extending from the origin 500 in the vertical direction is the z axis is a coordinate system XYZ, as shown in FIGS. 5A and 5B.

Figure 5D:
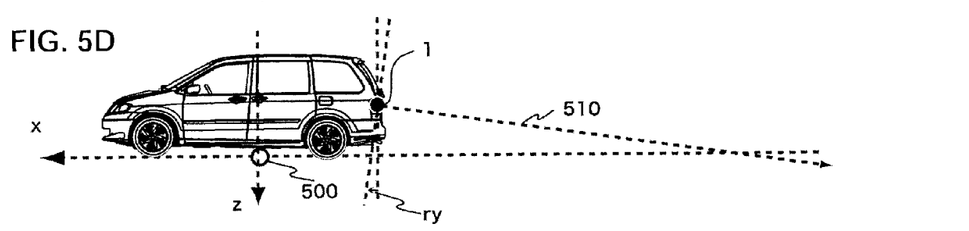
Figure 5E:
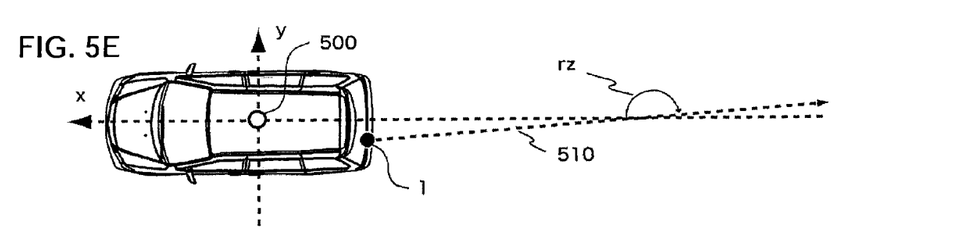

Moreover, it is assumed that tx represents an x coordinate of the camera 1 in the coordinate system XYZ, ty represents a y coordinate of the camera 1 in the coordinate system XYZ, tz represents a z coordinate of the camera 1 in the coordinate system XYZ, and the respective values of these coordinates are given fixed values determined by a position in the vehicle where the camera 1 is set. Moreover, it is assumed that rx represents the amount of rotation of an imaging axis (the imaging center direction of the camera 1) 510 of the camera 1 around the x axis in the coordinate system XYZ (rolling amount), as shown in FIG. 5C, ry represents the amount of rotation of the imaging axis 510 of the camera 1 around the y axis in the coordinate system XYZ (pitching amount), as shown in FIG. 5D, and rz represents the amount of rotation of the imaging axis 510 of the camera 1 around the z axis in the coordinate system XYZ (yawing amount), as shown in FIG. 5E.

Figure 5F:
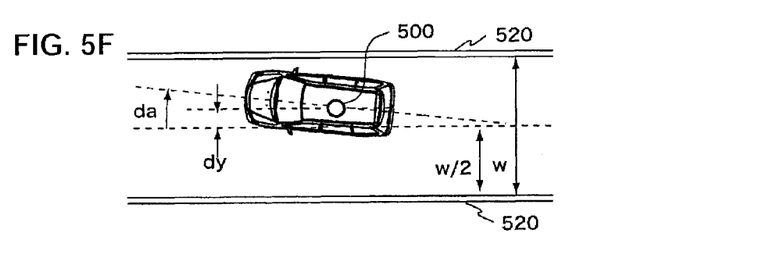

Moreover, it is assumed that w represents the spacing (lane width) between lane marks (lane lines) 520 on the left and right sides of the vehicle, dy represents the amount of displacement of the origin 500 of the coordinate system XYZ, in the left and right direction, from a line passing through the midpoint between the lane marks 520 in parallel with the lane marks 520, and da represents an angle which, on the horizontal plane, a direction (the direction of the lane) in which the lane marks 520 extend forms with the x axis (the forward and backward direction of the vehicle) of the coordinate system XYZ, as shown in FIG. 5F.

In step 402, assuming that a vector space that includes each state vector $\chi$=(tx, ty, tz, rx, ry, rz, w, dy, da) as an element is a vector space X ($\chi \in$ X), the state vector $\chi$=(tx, ty, tz, rx, ry, rz, w, dy, da) including the aforementioned given fixed values as the respective values of the elements (tx, ty, tz) and any value within a predetermined possible range for each of rx, ry, rz, w, dy, and da as the value of a corresponding one of the elements (rx, ry, rz, w, dy, da), N state vectors X are randomly extracted from the vector space X to be set as N state vectors $\chi$ (i). However, the respective values of the elements (tx, ty, tz) may not be fixed values. In this case, in step 402, assuming that a vector space that includes each state vector $\chi$=(tx, ty, tz, rx, ry, rz, w, dy, da) as an element is a vector space X ($\chi \in$ X), the state vector X=(tx, ty, tz, rx, ry, rz, w, dy, da) including any value within a predetermined possible range for each of tx, ty, tz, rx, ry, rz, w, dy, and da as the value of a corresponding one of the elements (tx, ty, tz, rx, ry, rz, w, dy, da), N state vectors $\chi$ are randomly extracted from the vector space X to be set as N state vectors $\chi$ (i).

When the N state vectors $\chi$ (i) have been generated in this manner in step 402, in step 404, the weight of each of the state vectors X (i) is set to 1/N.

Then, in step 406, the state vector $\chi$ (i) is updated according to a predetermined dynamics model. In this case, it is assumed that the state vector $\chi$ (i) is updated simply by adding predetermined white noise to each of the elements (rx, ry, rz, w, dy, da) of the state vector $\chi$ (i). When the respective values of the elements (tx, ty, tz) are not fixed values, it is assumed that the state vector $\chi$ (i) is updated by adding white noise to each of the elements (tx, ty, tz, rx, ry, rz, w, dy, da) of the state vector $\chi$ (i).

Then, in step 408, lane mark edge positions regarding the updated state vector $\chi$ (i) are generated as a reference state vector $\chi r$(i).

Lane mark edge positions regarding a certain state vector $\chi$ (k) represent the respective positions of the edges of lane marks to be included in an image captured by the camera 1 when the respective values of (tx, ty, tz, rx, ry, rz, w, dy, da) are values shown by the state vector $\chi$ (k) and can be obtained in the following manner.

The respective positions of the edges of lanes marks on the left and right sides of the vehicle in the coordinate system XYZ are first obtained from (w, dy, da) shown by the state vector $\chi$ (k).

Then, coordinates (up, vp) on an image captured by the camera 1 on which the respective positions of the edges of lanes marks are printed are obtained from the obtained positions of the edges of lanes marks by equation 1.

In equation 1, k1 and k2 represent the distortion factors of the lens of the camera I in the radial direction, p1 and p2 represent the distortion factors of the lens of the camera 1 in the circumferential direction, fx and fy represent the focal length of the camera 1, and cx and cy represent the optical center in an image in the lens of the camera 1. The respective values of these variables are predetermined for the camera 1 and the lens in use.

$$M = [T \times Rz \times Ry \times Rx] \quad [\text{E1}]$$

$$\begin{bmatrix} s \\ u \\ v \\ 1 \end{bmatrix} = M^{-1} \begin{bmatrix} x \\ y \\ z \\ 1 \end{bmatrix}$$

$$Rx = \begin{bmatrix} 1 & 0 & 0 & 0 \\ 0 & \cos(rx) & -\sin(rx) & 0 \\ 0 & \sin(rx) & \cos(rx) & 0 \\ 0 & 0 & 0 & 1 \end{bmatrix}$$

$$Ry = \begin{bmatrix} \cos(ry) & 0 & \sin(ry) & 0 \\ 0 & 1 & 0 & 0 \\ -\sin(ry) & 0 & \cos(ry) & 0 \\ 0 & 0 & 0 & 1 \end{bmatrix}$$

$$Rz = \begin{bmatrix} \cos(rz) & -\sin(rz) & 0 & 0 \\ \sin(rz) & \cos(rz) & 0 & 0 \\ 0 & 0 & 1 & 0 \\ 0 & 0 & 0 & 1 \end{bmatrix}$$

$$T = \begin{bmatrix} 0 & 0 & 0 & tx \\ 0 & 0 & 0 & ty \\ 0 & 0 & 0 & tz \\ 0 & 0 & 0 & 1 \end{bmatrix}$$

$$u' = \frac{u}{s}$$

$$v' = \frac{v}{s}$$

$$r^2 = u'^2 + v'^2$$

$$u'' = u'(1 + k_1 r^2 + k_2 r^4) + 2p_1 u'v' + p_2(r^2 + 2u'^2)$$

$$v'' = y'(1 + k_1 r^2 + k_2 r^4) + p_1(r^2 + 2v'^2) + 2p_2 u'v'$$

$$u_p = fx_x u'' + cx$$

$$v_p = fy_x v'' + cy$$

When N reference state vectors χr(i) corresponding to the N state vectors χ (i) have been obtained in this manner in step 408, considering the positions of the edges of lane marks in the image captured by the camera 1 as an observation vector z, the degree of match between each of the reference state vectors χr(i) and the observation vector z is calculated as the likelihood of a state vector χ (i).

Figure 6:
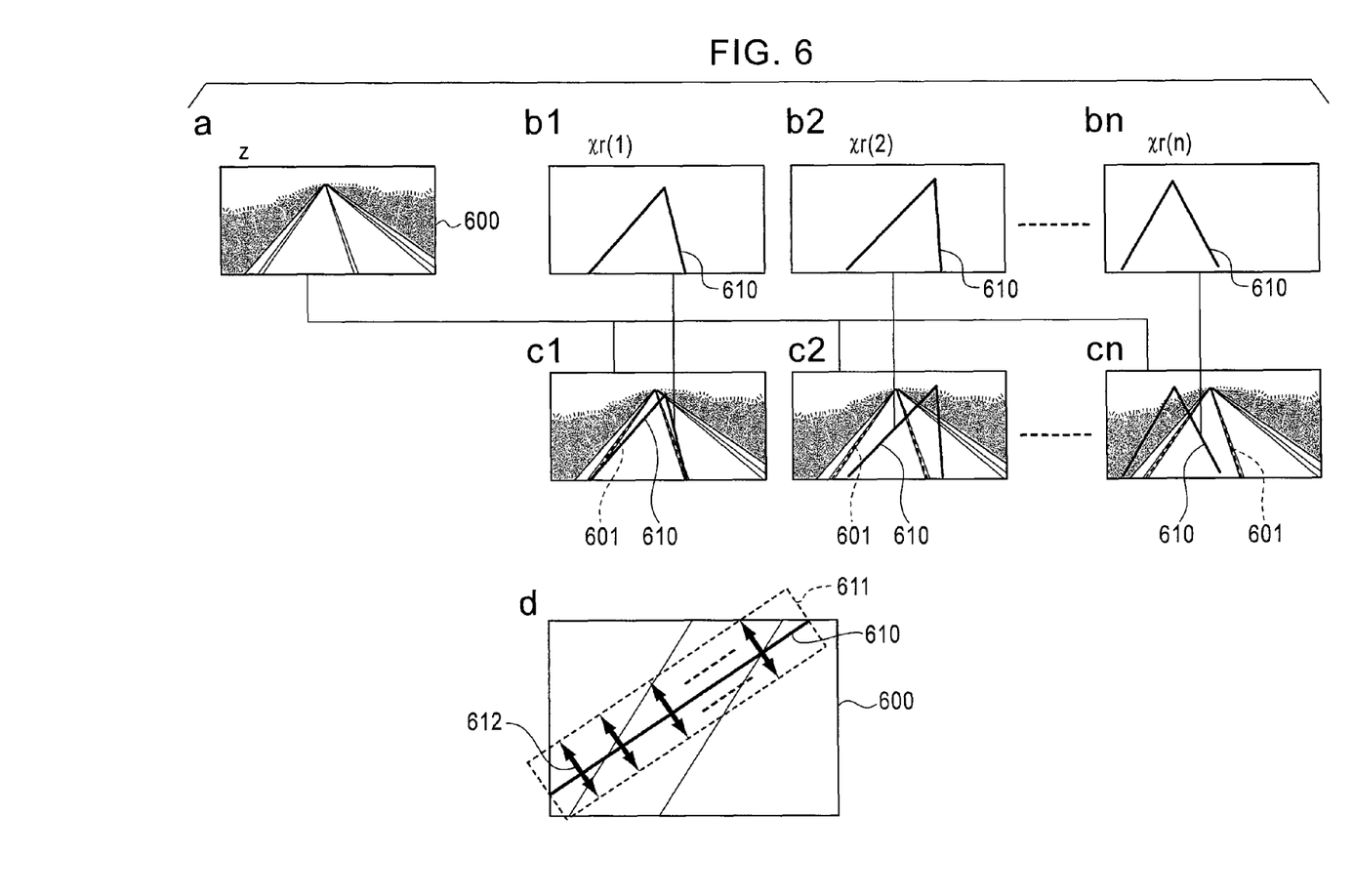
FIG. 6 shows exemplary camera state correction according to the exemplary embodiment.

That is, for example, assuming that the image captured by the camera 1 set as the observation vector z is that shown in Part a of FIG. 6, and the positions of the edges of lane marks calculated as the individual reference state vectors χr(i) where i=1 to n are those shown in Parts b1, b2, . . . , bn of FIG. 6, in step 408, edges 601 of lane marks in a camera captured image 600 shown by the observation vector z are compared with edges 610 of lane marks the respective positions of which are shown by each of the reference state vectors χr(i), as shown in Parts c1, c2, . . . , cn of FIG. 6. Then, the likelihood of each of the state vectors χ (i) is calculated so that, the closer to each other corresponding edges are, the higher the likelihood is.

In this case, calculation of the likelihood by comparing the edges of lane marks in the camera captured image shown by the observation vector z with the edges of lane marks the respective positions of which are shown by each of the reference state vectors χr(i) may be simply performed in a manner that depends on whether predetermined edges exist on the respective positions of the edges of lane marks shown by the reference state vector χr(i) in the camera captured image.

That is, the gradients of variations in brightness in a direction 612 perpendicular to a direction in which each of the edges 610 extends in a neighborhood 611 of the edge 610 in the camera captured image 600 may be obtained, and the average of the obtained gradients of variations in brightness may be used as the likelihood, as shown in Part d of FIG. 6 under magnification.

Then, in step 412, the posterior probability that is determined by Bayes' theorem in proportion to the likelihood calculated for each of the state vectors χ (i) is set as the weight of the state vector χ (i). In this case, the respective weights of the state vectors X (i) are changed so that the total of the respective weights of the state vectors χ (i) is one, and the higher the calculated likelihood is, the heavier the weight is.

Then, in step 414, a weighted average state vector in which the respective weights of the N state vectors χ (i) calculated in step 412 are used is determined and sent to the bird's eye view image generation unit 3 as a camera state vector indicating the position and posture of the camera 1.

In this case, the bird's eye view image generation unit 3, which has received the camera state vector, generates a bird's eye view image by performing view transformation on the image captured by the camera 1, using the elements (tx, ty, tz, rx, ry, rz) of the camera state vector as the position and posture of the camera 1, and displays the generated bird's eye view image on the display unit 4, as described above.

Then, in step 416, on the basis of the respective weights of the N state vectors χ (i), new N state vectors χ (i) are generated (resampled). In step 416, new N state vectors χ (i) are generated by deleting a state vector χ with a light weight and duplicating a state vector χ with a heavy weight. That is, for example, the respective weights of the state vectors χ (i) are quantized so that each of the weights is zero or an integral multiple of 1/N and the total of the respective weights of the state vectors χ (i) is one. Then, (L−1) state vectors are generated by deleting a state vector with a weight of zero and duplicating a state vector with a weight of L/N (L>2). Then, state vectors with a weight of 1/N or more that are not deleted and a state vector generated by duplication are set as new N state vectors χ (i).

Then, the process returns to the processing from step 402.

The camera state correction performed by the camera state correction unit 2 has been described.

In step 406 in the aforementioned camera state correction, the control unit 5 may update each of the state vectors χ (i) by adding, to the elements (rx, ry, rz, w, dy, da) of the state vector χ (i), values obtained by adding appropriate white noise to the amount of variation of each of the elements (rx, ry, rz, w, dy, da) after the state vectors χ (i) were generated last time estimated on the basis of the behavior of a vehicle calculated using the vehicle state sensor 6 and a predetermined dynamics model of the vehicle. In this case, when the respective values of (tx, ty, tz) are not fixed values, each of the state vectors χ (i) is changed by adding, to the elements (tx, ty, tz, rx, ry, rz, w, dy, da) of the state vector χ (i), values obtained by adding appropriate white noise to the amount of variation of each of the elements (tx, ty, tz, rx, ry, rz, w, dy, da) after the state vectors χ (i) were generated last time.

Moreover, in step 414 in the aforementioned camera state correction, the average of weighted average state vectors of the generated N state vectors χ (i) for a predetermined last time period may be determined and sent to the bird's eye view image generation unit 3 as a camera state vector. Alternatively yet, in step 414, a state vector with the maximum weight set in step 412 out of the state vectors χ (i) or the average of such state vectors for a predetermined last time period may be determined and sent to the bird's eye view image generation unit 3 as a camera state vector. Alternatively yet, in step 414, the posterior probability distribution in the vector space X may be estimated by, for example, interpolation on the basis of the respective weights (posterior probabilities) of the state vectors χ (i) set in step 412 to generate a state vector the posterior probability of which reaches a peak value or the average of such state vectors for a predetermined last time period which is sent to the bird's eye view image generation unit 3 as a camera state vector.

Moreover, instead of step 414, a step to calculate an average state vector of N state vectors χ (i) resampled in step 416 or the average of such state vectors for a predetermined last time period and the send the results to the bird's eye view image generation unit 3 as a camera state vector may be provided.

Moreover, in the aforementioned camera state correction, since the start of the processing until steps 404 to 416 are repeated a predetermined number of times, a camera state vector may not be sent to the bird's eye view image generation unit 3. Alternatively, when, for example, the variance or standard deviation of the N state vectors χ (i) generated in step 414 does not fall below a predetermined threshold value, a camera state vector indicating the position and posture of the camera 1 may not be sent to the bird's eye view image generation unit 3.

Alternatively, for example, in a case where the aforementioned camera state correction is performed in a state in which a vehicle is static, when steps 404 to 416 have been repeated a predetermined number of times or when the variance or standard deviation of the N state vectors χ (i) generated in step 414 has fallen below a predetermined threshold value, the camera state correction may be terminated.

The exemplary embodiment of the present invention has been described.

According to the exemplary embodiment, the alignment, such as a position and a posture, of the camera 1 installed in a vehicle can be obtained, using the fact that the pattern of a lane mark the image of which is captured by the camera 1 is uniquely determined in a manner that depends on the states of the position of the camera 1 with respect to the reference point of a vehicle, the posture of the camera 1, the width of a lane where the vehicle is located, the position of the vehicle in the width direction of the lane, and the orientation of the vehicle with respect to the direction of the lane, by applying a particle filter when particles are true, the states being the particles, the degree of match between the shape of a lane mark to be included in an image captured by the camera 1 and the shape of a lane mark included in the image being the weight. Thus, in an arrangement that does not need any particular device such as a laser, alignment information that represents the alignment, such as a position and a posture, of the camera 1 installed in a vehicle can be corrected.

While a case where a camera state vector calculated by the camera state correction unit 2 is used for view transformation for generating a bird's eye view image in the bird's eye view image generation unit 3 has been described, the camera state vector may be used to determine the position and posture of the camera 1 in various types of processing. That is, for example, when an obstacle in the neighborhood is detected on the basis of an image captured by the camera 1, the position, orientation, and the like of the obstacle coming out in the image can be calculated using the position and posture of the camera 1 represented by a camera state vector calculated by the camera state correction unit 2.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

The invention claimed is:

1. An in-vehicle device installed in a vehicle comprising:
    a camera configured to capture images of surroundings of the vehicle;
    a memory configured to store computer programs; and
    a microprocessor configured to access the memory and to execute the computer programs stored in the memory such that the microprocessor is configured to act as a correction unit configured to correct alignment information that represents alignment of the camera, the correction unit comprising:
        a sampling unit configured to repeat a sampling process of sampling N state vectors each of which includes, as elements, a position of the camera with respect to a reference point of the vehicle, a posture of the camera, a width of a lane on which the vehicle is located, a position of the vehicle in a width direction of the lane, and an orientation of the vehicle with respect to a direction of the lane;
        an update unit configured to update the N state vectors sampled by the sampling unit as much as an amount based on a predetermined dynamics model or a random amount;
        a weight calculation unit configured to, for each of the N state vectors updated by the update unit, when respective values of individual elements of the state vector are true, calculate a shape of a lane mark to be included in an image captured by the camera and calculate, as a weight of the state vector, a degree of similarity between the calculated shape of the lane mark and a shape of a lane mark in the image captured by the camera; and
        an alignment information generation unit configured to estimate current alignment of the camera on the basis of the N state vectors, the respective weights of which are calculated by the weight calculation unit, and the respective weights of the N state vectors or on the basis of the N state vectors sampled by the sampling unit and generate the alignment information, which represents the estimated alignment,
    wherein, in the sampling process for the second and subsequent times, the sampling unit samples new N state vectors on the basis of the respective weights of the N state vectors calculated by the weight calculation unit, such that an image displayed within the vehicle is updated on the basis of the alignment information generated by the correction unit.

2. The in-vehicle device according to claim 1, wherein the alignment of the camera represented by the alignment information includes at least one of the position of the camera with respect to the reference point of the vehicle and the posture of the camera.

3. The in-vehicle device according to claim 1, wherein, for each of the N state vectors updated by the update unit, when respective values of individual elements of the state vector are true, the weight calculation unit is configured to calculate the degree of similarity in a manner that depends on whether any edge exists on a position in the image captured by the camera, the position in the image captured corresponding to a position of an edge of the lane mark to be included in the image captured by the camera.

4. The in-vehicle device according to claim 1, further comprising a running state detection unit configured to detect a running state of the vehicle, wherein the update unit updates the N state vectors sampled by the sampling unit in a manner that depends on the dynamics model and the running state detected by the running state detection unit.

5. The in-vehicle device according to claim 1, further comprising a bird's eye view image display unit configured to generate and display a bird's eye view image showing how the surroundings of the vehicle are observed from a position above the vehicle by performing view transformation on the image captured by the camera on the basis of the alignment information generated by the correction unit.

6. The in-vehicle device according to claim 1, wherein, in the sampling process for the second and subsequent times, the sampling unit is configured to sample the new N state vectors on the basis of the respective weights of the N state vectors calculated by the weight calculation unit by deleting a state vector with a light weight and duplicating a state vector with a heavy weight out of the N state vectors updated by the update unit.

7. The in-vehicle device according to claim 1, wherein the alignment information generation unit is configured to estimate, as the current alignment of the camera, alignment of the camera represented by a weighted average vector of the N state vectors in which the weights calculated by the weight calculation unit are used.

8. The in-vehicle device according to claim 1, wherein the alignment information generation unit is configured to estimate, as the current alignment of the camera, alignment of the camera represented by an average vector, for a time period, of weighted average vectors of the N state vectors in which the weights calculated by the weight calculation unit are used.

9. The in-vehicle device according to claim 1, wherein the alignment information generation unit is configured to estimate, as the current alignment of the camera, alignment of the camera represented by an average vector of the N state vectors sampled by the sampling unit.

10. The in-vehicle device according to claim 1, wherein the alignment information generation unit is configured to estimate, as the current alignment of the camera, alignment of the camera represented by an average vector, for a time period, of average vectors of the N state vectors sampled by the sampling unit.

11. The in-vehicle device according to claim 1, wherein the alignment information generation unit is configured to estimate, as the current alignment of the camera, alignment of the camera represented by a state vector with a maximum weight calculated by the weight calculation unit.

12. The in-vehicle device according to claim 1, wherein the alignment information generation unit is configured to estimate, as the current alignment of the camera, alignment of the camera represented by an average vector, for a time period, of state vectors with a maximum weight calculated by the weight calculation unit.

13. The in-vehicle device according to claim 1, wherein the alignment information generation unit does not generate the alignment information until the sampling unit performs the sampling process a predetermined number of times.

14. The in-vehicle device according to claim 1, wherein the alignment information generation unit does not generate the alignment information until a variance or a standard deviation of the N state vectors sampled by the sampling unit becomes equal to or less than a predetermined threshold value.

15. The in-vehicle device according to claim 1, wherein the sampling unit completes the sampling process upon performing the sampling process a predetermined number of times.

16. The in-vehicle device according to claim 1, wherein the sampling unit completes the sampling process when a variance or a standard deviation of the sampled N state vectors becomes equal to or less than a predetermined threshold value.

17. A memory storing one or more computer programs that directs a microprocessor to perform acts of:
repeating a sampling process of sampling N state vectors each of which includes, as elements, a position of a camera that captures images of surroundings of a vehicle with respect to a reference point of the vehicle, a posture of the camera, a width of a lane on which the vehicle is located, a position of the vehicle in a width direction of the lane, and an orientation of the vehicle with respect to a direction of the lane;
updating the N state vectors sampled as much as an amount based on a predetermined dynamics model or a random amount;
calculating a shape of a lane mark to be included in an image captured by the camera and calculating, as a weight of the state vector, a degree of similarity between the calculated shape of the lane mark and a shape of a lane mark in the image captured by the camera for each of the N state vectors updated when respective values of individual elements of the state vector are true; and
estimating current alignment of the camera on the basis of the N state vectors and the respective weights of the N state vectors or on the basis of the N state vectors sampled and generate alignment information, which represents the estimated alignment,
wherein, in the sampling process for the second and subsequent times, new N state vectors are sampled on the basis of the respective weights of the N state vectors calculated, such that an image displayed within the vehicle is updated on the basis of the alignment information generated.

18. The memory of claim 17, wherein the alignment of the camera represented by the alignment information includes at least one of the position of the camera with respect to the reference point of the vehicle and the posture of the camera.

19. The memory claim 17, wherein, for each of the N state vectors updated, when respective values of individual elements of the state vector are true, the degree of similarity is calculated in a manner that depends on whether any edge exists on a position in the image captured by the camera, the position in the image captured corresponding to a position of an edge of the lane mark to be included in the image captured by the camera.

20. A method for correcting alignment information that represents alignment of a camera in an in-vehicle device installed in a vehicle provided with the camera shooting surroundings of the vehicle, the method comprising:
repeating a sampling process of sampling N state vectors each of which includes, as elements, a position of the camera with respect to a reference point of the vehicle, a posture of the camera, a width of a lane on which the vehicle is located, a position of the vehicle in a width direction of the lane, and an orientation of the vehicle with respect to a direction of the lane;
updating the sampled N state vectors as much as an amount based on a predetermined dynamics model or a random amount;
for each of the updated N state vectors, when respective values of individual elements of the state vector are true, calculating a shape of a lane mark to be included in an image captured by the camera and calculating, as a weight of the state vector, a degree of similarity between the calculated shape of the lane mark and a shape of a lane mark in the image captured by the camera; and
estimating current alignment of the camera on the basis of the N state vectors the respective weights of which are calculated and the respective weights of the N state vectors or on the basis of the sampled N state vectors and generating the alignment information, which represents the estimated alignment,
wherein, in the sampling process for the second and subsequent times, new N state vectors are sampled on the basis of the calculated weights of the N state vectors, such that an image displayed within the vehicle is updated on the basis of the alignment information generated.

* * * * *